US012676507B2

(12) United States Patent
Keppler et al.

(10) Patent No.: US 12,676,507 B2
(45) Date of Patent: Jul. 7, 2026

(54) DYNAMIC BOOST WITH CONSTANT CURRENT MODE

(71) Applicant: Avago Technologies International Sales Pte. Limited, Singapore (SG)

(72) Inventors: Marc Keppler, Windsor, CO (US); John Walley, Ladera Ranch, CA (US); Jim Le, Fort Collins, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 680 days.

(21) Appl. No.: 18/311,502

(22) Filed: May 3, 2023

(65) Prior Publication Data

US 2024/0178702 A1 May 30, 2024

Related U.S. Application Data

(60) Provisional application No. 63/385,060, filed on Nov. 28, 2022.

(51) Int. Cl.
| | |
|---|---|
| *H02J 50/10* | (2016.01) |
| *H02M 1/00* | (2007.01) |
| *H02M 3/335* | (2006.01) |
| *H02M 7/219* | (2006.01) |
| *H02J 7/02* | (2016.01) |
| *H02M 1/08* | (2006.01) |
| *H02M 3/156* | (2006.01) |
| *H02M 3/158* | (2006.01) |

(52) U.S. Cl.
CPC .......... *H02J 50/10* (2016.02); *H02M 1/0003* (2021.05); *H02M 3/33592* (2013.01); *H02M 7/219* (2013.01); *H02J 7/02* (2013.01); *H02J*
*2207/20* (2020.01); *H02M 1/0009* (2021.05); *H02M 1/08* (2013.01); *H02M 3/156* (2013.01); *H02M 3/158* (2013.01); *Y02B 70/10* (2013.01)

(58) Field of Classification Search
CPC .. H02J 50/10; H02M 1/0003; H02M 3/33592; H02M 7/219
USPC ......................................................... 320/108
See application file for complete search history.

(56) References Cited

U.S. PATENT DOCUMENTS

| | | | | |
|---|---|---|---|---|
| 7,276,812 | B2 * | 10/2007 | Uhl | H02J 50/12 |
| | | | | 307/61 |
| 7,595,732 | B2 * | 9/2009 | Shameli | G06K 19/0723 |
| | | | | 323/225 |
| 8,228,025 | B2 * | 7/2012 | Ho | H02J 50/12 |
| | | | | 320/108 |
| 8,390,249 | B2 * | 3/2013 | Walley | H02J 7/485 |
| | | | | 320/108 |

(Continued)

FOREIGN PATENT DOCUMENTS

EP        3 667 891 A1        6/2020

*Primary Examiner* — John T Trischler
(74) *Attorney, Agent, or Firm* — Quarles & Brady LLP

(57) ABSTRACT

A system and apparatuses for dynamic boost with constant current mode are provided. According a specific embodiment, the present invention provides an apparatus comprising a first circuit that receives a wireless power signal and generates alternating current signals, and a second circuit that rectifies the input signal to produce a direct current output. The second circuit, equipped with low-side and high-side transistors, dynamically boosts the output signal and is capable of entering a constant current mode, maintaining transistor activation for a specified duration.

19 Claims, 5 Drawing Sheets

200

(56) References Cited

U.S. PATENT DOCUMENTS

| | | | | |
|---|---|---|---|---|
| 8,410,637 B2* | 4/2013 | Karaoguz | G06K 7/10346 | 307/104 |
| 8,411,470 B2* | 4/2013 | Sato | H02M 3/3378 | 363/21.06 |
| 8,436,491 B2* | 5/2013 | Walley | H02J 50/10 | 307/104 |
| 8,525,370 B2* | 9/2013 | Walley | H04B 5/79 | 307/104 |
| 8,618,697 B2* | 12/2013 | Karaoguz | G06K 19/0715 | 307/104 |
| 8,716,977 B2* | 5/2014 | Walley | H02J 7/485 | 320/108 |
| 8,952,655 B2* | 2/2015 | Walley | H02J 7/485 | 320/108 |
| 9,088,219 B2* | 7/2015 | Zhang | H02M 3/33507 | |
| 9,094,054 B2* | 7/2015 | Walley | H02J 50/10 | |
| RE45,651 E* | 8/2015 | Ho | H02J 50/12 | |
| 9,270,139 B2* | 2/2016 | Rofougaran | G06F 1/266 | |
| 9,362,986 B2* | 6/2016 | Karaoguz | H02J 50/12 | |
| 9,401,623 B2* | 7/2016 | Walley | H02J 7/485 | |
| 9,583,970 B2* | 2/2017 | Hsia | H02J 7/90 | |
| 9,590,444 B2* | 3/2017 | Walley | H02J 50/10 | |
| 9,667,322 B2* | 5/2017 | Walley | H04B 5/79 | |
| 9,680,326 B2* | 6/2017 | Van Der Lee | H02J 50/80 | |
| 9,806,767 B2* | 10/2017 | Walley | G06K 7/10207 | |
| 9,825,472 B2* | 11/2017 | Walley | H02J 50/90 | |
| 9,871,386 B2* | 1/2018 | Desrosiers | H02J 7/64 | |
| 9,923,381 B2* | 3/2018 | Walley | H02J 50/80 | |
| 9,954,581 B2* | 4/2018 | Mehas | H02J 50/80 | |
| 9,985,443 B2* | 5/2018 | Walley | H02M 7/1626 | |
| 9,991,818 B2* | 6/2018 | Mehas | H02M 7/23 | |
| 9,998,180 B2* | 6/2018 | Bakker | G05B 13/0205 | |
| 10,003,278 B2* | 6/2018 | Hajimiri | H02M 7/217 | |
| 10,044,228 B2* | 8/2018 | Sankar | H02J 50/12 | |
| 10,056,787 B2* | 8/2018 | Morikawa | H02J 50/12 | |
| 10,116,279 B2* | 10/2018 | Ritter | H02J 50/80 | |
| 10,312,743 B2* | 6/2019 | Ouda | H02J 50/20 | |
| 10,476,302 B2* | 11/2019 | Walley | H02M 3/155 | |
| 10,476,400 B1* | 11/2019 | Le | H02J 50/12 | |
| 10,516,273 B2* | 12/2019 | Desrosiers | H02J 7/64 | |
| 10,644,531 B1* | 5/2020 | Qiu | H02J 50/10 | |
| 10,673,351 B2* | 6/2020 | Hajimiri | H02M 7/217 | |
| 10,985,619 B2* | 4/2021 | Walley | G06K 19/0723 | |
| 11,101,674 B2* | 8/2021 | Walley | H02J 7/47 | |
| 11,159,025 B2* | 10/2021 | Desrosiers | H02J 7/64 | |
| 11,165,364 B2* | 11/2021 | Zhan | H02J 50/00 | |
| 11,817,796 B2* | 11/2023 | Le | H04B 5/79 | |
| 11,862,986 B1* | 1/2024 | Walley | H02J 50/12 | |
| 11,949,243 B2* | 4/2024 | Toula | H02J 50/12 | |
| 12,040,628 B2* | 7/2024 | Guedon | H02M 1/0045 | |
| 12,074,533 B2* | 8/2024 | Walley | H02J 50/10 | |
| 12,237,695 B2* | 2/2025 | Walley | H02J 50/12 | |
| 12,323,072 B2* | 6/2025 | Walley | H02J 50/10 | |
| 12,463,556 B2* | 11/2025 | Le | H02M 1/088 | |
| 12,531,474 B2* | 1/2026 | Mann | H02M 1/32 | |
| 2004/0051628 A1* | 3/2004 | Uhl | H02M 3/1584 | 307/43 |
| 2007/0236851 A1* | 10/2007 | Shameli | G06K 19/0701 | 361/113 |
| 2009/0121675 A1* | 5/2009 | Ho | H02J 50/12 | 320/108 |
| 2011/0075464 A1* | 3/2011 | Sato | H02M 3/3378 | 363/127 |
| 2011/0077718 A1* | 3/2011 | Rofougaran | A61N 1/325 | 307/104 |
| 2011/0127843 A1* | 6/2011 | Karaoguz | G06K 7/10207 | 307/104 |
| 2011/0127844 A1* | 6/2011 | Walley | G06K 7/10207 | 307/104 |
| 2011/0127845 A1* | 6/2011 | Walley | H04B 5/79 | 307/104 |
| 2011/0127951 A1* | 6/2011 | Walley | H02J 50/10 | 320/108 |
| 2011/0127952 A1* | 6/2011 | Walley | G06K 19/0715 | 320/108 |
| 2011/0127953 A1* | 6/2011 | Walley | G06K 19/0723 | 320/108 |
| 2011/0127954 A1* | 6/2011 | Walley | H02J 7/485 | 320/108 |
| 2011/0130093 A1* | 6/2011 | Walley | H02J 50/10 | 307/104 |
| 2012/0091799 A1* | 4/2012 | Rofougaran | H02J 50/20 | 307/29 |
| 2013/0154560 A1* | 6/2013 | Walley | H02J 7/485 | 320/108 |
| 2013/0229066 A1* | 9/2013 | Karaoguz | H02J 50/80 | 307/104 |
| 2014/0091626 A1* | 4/2014 | Walley | H02J 7/485 | 307/104 |
| 2014/0094116 A1* | 4/2014 | Walley | H02J 7/44 | 455/41.1 |
| 2014/0117772 A1* | 5/2014 | Karaoguz | H02J 50/12 | 307/104 |
| 2014/0153291 A1* | 6/2014 | Zhang | H05B 45/385 | 363/21.01 |
| 2014/0184150 A1* | 7/2014 | Walley | H04B 5/79 | 320/108 |
| 2014/0184152 A1* | 7/2014 | Van Der Lee | H02J 50/80 | 320/108 |
| 2014/0225560 A1* | 8/2014 | Walley | H02J 7/485 | 320/108 |
| 2014/0265610 A1 | 9/2014 | Bakker et al. | | |
| 2015/0145350 A1* | 5/2015 | Hajimiri | H02M 7/217 | 307/149 |
| 2015/0155739 A1* | 6/2015 | Walley | H02J 7/485 | 320/108 |
| 2015/0215006 A1* | 7/2015 | Mehas | H04B 5/79 | 307/104 |
| 2015/0244341 A1* | 8/2015 | Ritter | H02J 50/80 | 307/104 |
| 2015/0255989 A1* | 9/2015 | Walley | H02J 50/90 | 307/104 |
| 2015/0333563 A1* | 11/2015 | Rofougaran | H02J 50/10 | 713/310 |
| 2015/0340876 A1* | 11/2015 | Walley | H02J 50/12 | 307/104 |
| 2016/0285279 A1* | 9/2016 | Mehas | H02M 7/23 | |
| 2016/0336783 A1* | 11/2016 | Hsia | H02J 7/90 | |
| 2017/0040842 A1* | 2/2017 | Morikawa | H02J 50/12 | |
| 2017/0040846 A1* | 2/2017 | Sankar | H02J 50/12 | |
| 2017/0098966 A1* | 4/2017 | Walley | H02M 7/219 | |
| 2017/0126021 A1* | 5/2017 | Desrosiers | H02J 7/64 | |
| 2017/0141585 A1* | 5/2017 | Walley | H02M 7/1626 | |
| 2018/0041060 A1* | 2/2018 | Walley | H02J 7/47 | |
| 2018/0069486 A1* | 3/2018 | Ouda | H02J 50/20 | |
| 2018/0102652 A1* | 4/2018 | Desrosiers | H02J 7/64 | |
| 2019/0173389 A1* | 6/2019 | Hajimiri | H02M 7/217 | |
| 2019/0305827 A1* | 10/2019 | Walley | G06K 7/10346 | |
| 2020/0091731 A1* | 3/2020 | Desrosiers | H02J 7/64 | |
| 2020/0144927 A1* | 5/2020 | Le | H02M 1/143 | |
| 2020/0195164 A1* | 6/2020 | Zhan | H02M 7/219 | |
| 2021/0234412 A1* | 7/2021 | Walley | H02J 50/10 | |
| 2022/0140657 A1 | 5/2022 | Guedon | | |
| 2022/0200344 A1* | 6/2022 | Toula | H02J 50/12 | |
| 2022/0255358 A1* | 8/2022 | Mao | B60L 53/126 | |
| 2022/0360117 A1 | 11/2022 | Stingu et al. | | |
| 2023/0283196 A1* | 9/2023 | Le | H02M 7/219 | |
| 2024/0030747 A1* | 1/2024 | Walley | H02J 50/12 | |
| 2024/0030832 A1* | 1/2024 | Le | H02M 1/08 | |
| 2024/0039423 A1* | 2/2024 | Walley | H02J 50/10 | |
| 2024/0039424 A1* | 2/2024 | Walley | H02M 7/219 | |
| 2024/0088719 A1* | 3/2024 | Walley | H02J 50/12 | |
| 2024/0162800 A1* | 5/2024 | Mann | H02M 1/32 | |
| 2024/0405592 A1* | 12/2024 | Swamy | H02J 7/06 | |
| 2025/0183721 A1* | 6/2025 | Takahashi | H02J 50/12 | |

* cited by examiner

405 Determine whether in dynamic boost

410 Enable CCM operation

415 Determine threshold debounce time

420 Comparator output meets debounce time?

425 Switch output transistor operation

400

*505*

Processor(s)

*510*

Input Device(s)

*515*

Output Device(s)

*520*

Storage Device(s)

*525*

Communications
Subsystem

*530*

Working
Memory

Operating
System

*540*

*545*

Application(s)

*535*

*500*

DYNAMIC BOOST WITH CONSTANT CURRENT MODE

CROSS REFERENCE TO RELATED APPLICATIONS

This application is a non-provisional application of U.S. Patent Application No. 63/385,060, filed Nov. 28, 2022, by Keppler et al. and titled, "Dynamic Boost with Constant Current Mode", the entire teachings of which is incorporated herein by reference in its entirety for all purposes.

FIELD

The present disclosure relates, in general, to methods, systems, and apparatuses for a substrate with differing dielectric constants.

BACKGROUND

Wireless power transfer has become an increasingly common way to charge batteries in electronic devices. In conventional wireless power transfer, the received wireless power signal may be degraded, causing inefficient charging or preventing charging altogether. Dynamic boost is a special rectifier mode of a rectifier which has been proposed to improve wireless power transfer performance. However, dynamic boost introduces issues due to discontinuous conduction mode ("DCM") and comparator chatter.

Thus, methods, systems, and apparatuses for implementing dynamic boost with constant current mode ("CCM") are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
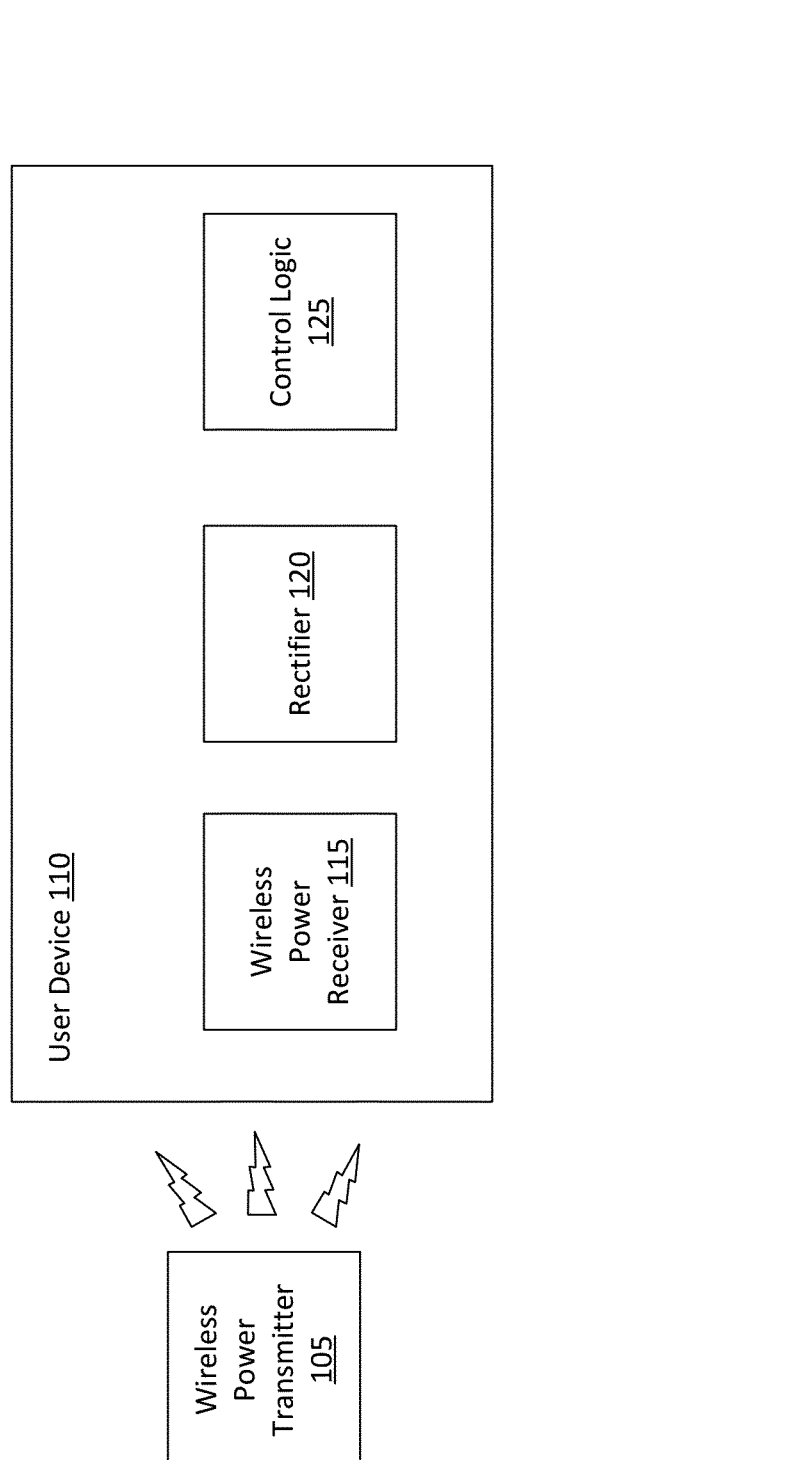
FIG. 1 is a schematic block diagram of a system for dynamic boost with constant current mode, in accordance with various embodiments.
Figure 1:
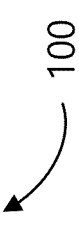

Various embodiments set forth systems, methods, and apparatuses for implementing dynamic boost with CCM.

In some embodiments, an apparatus for dynamic boost with CCM is provided.

In further embodiments, a system for dynamic boost with CCM is provided.

In further embodiments, a method for dynamic boost with CCM is provided.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Dynamic boost is a rectifier mode that forces the two rectifier low-side FETs to be enabled simultaneously for a programmable time ("tboost") after each falling transition of a received alternating current (AC) signal at respective AC nodes (e.g., AC1 and AC2, collectively referred to as "ACx"). In some examples, a large ringing on the ACx nodes in DCM can cause the rectifier comparators to enable/disable the rectifier output field effect transistors (FET) multiple times per clock (FCLK) cycle. This results in undesired behavior in dynamic boost mode and can result in the rectified output voltage signal (VRECT) dropping and poor amplitude shift keying (ASK) magnitude and phase response. Furthermore, the low-side rectifier comparator inputs can be close to the comparators threshold when the comparator is activated during dynamic boost, causing the low-side comparator to chatter and the rectifier high-side FETs to toggle on/off multiple times per FCLK cycle. This can cause reduced efficiency, increased electromagnetic interference (EMI), and VRECT droop during dynamic boost operation.

A dynamic boost with CCM operation is set forth. CCM, commonly referred to as "continuous conduction mode," may be enabled in conjunction with dynamic boost. By enabling CCM, the rectifier is prevented from entering DCM. Moreover, CCM eliminates comparator chatter by ignoring comparator outputs until the comparator inputs have fully settled. Thus, improvements to dynamic boost operation may be realized.

FIG. 1 is a schematic block diagram of a system 100 for dynamic current boost with constant current mode, in accordance with various embodiments. The system 100 includes a wireless power transmitter 105, user device 110, wireless power receiver 115, rectifier 120, and control logic 125. It should be noted that the various components of substrate 100A are schematically illustrated in FIG. 1, and that modifications to the various components and other arrangements of system 100 may be possible and in accordance with the various embodiments.

In various embodiments, the wireless power transmitter 105 may be part of a larger device, such as a wireless charger. The wireless power transmitter 105 may include circuitry and components for transmitting a wireless power signal. In some examples, the wireless power transmitter 105 includes a field coil (e.g., a wire coil used for transmitting or receiving wireless power) configured to create an oscillating magnetic field from an AC input through the field coil. Thus, as used herein, the wireless power signal may refer to the oscillating magnetic field transmitted through space to a receiving device (e.g., the wireless power receiver 115).

The wireless power signal may then be received by the wireless power receiver 115 of the user device 110. In various embodiments, the user device 110 may include a wireless device, such as a smartphone, tablet, smartwatch or other wearable device, or other electronic device capable of being charged wirelessly, such as batteries, charging banks and/or portable chargers, peripheral devices (e.g., computer mouse, keyboard, etc.), earphones, and the like. In yet further examples, the user device 110 may include a vehicle (e.g., an electric vehicle) and/or charging system of a vehicle battery.

The wireless power receiver 115, like the wireless power transmitter 105, may include a field coil, which may be configured to receive the wireless power signal and generate an AC signal in the charging the coil. Specifically, an AC signal is induced in the field coil of the wireless power receiver 115 via electromagnetic (EM) induction. The AC signal may be provided to a rectifier 120 for further processing.

Specifically, in various embodiments, the rectifier 120 may include a circuit and other components configured to convert an AC signal into a direct current (DC) signal in a process referred to as "rectification." Specifically, as used herein, rectification (e.g., conversion from AC to DC) includes conversion of non-ideal signals as may be implemented into real-world applications. Accordingly, AC signals may include non-ideal AC signals (e.g., not perfectly sinusoidal). Similarly, DC signals may include non-ideal DC signals (e.g., not perfectly constant).

Accordingly, to various embodiments, the rectifier 120 may output the DC signal (e.g., the rectified signal) to a battery and/or other components for charging and/or operation. The rectifier 120 may further be coupled to control logic 125. Control logic 125 may be configured to control the operation of the rectifier 120. Specifically, control logic 125 may include circuitry and/or other components, such as programmable logic and/or software. Thus, the control logic 125 may be configured to control the rectifier 120.

In various embodiments, the control logic 125 may be configured to cause the rectifier 120 to operate in a dynamic boost mode with CCM. Specifically, the control logic 125 may be configured to cause rectifier 120 to boost the voltage of VRECT under specific conditions, in conjunction with CCM as will be described in greater detail below with respect to FIG. 2.

Figure 2:
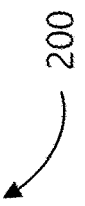
FIG. 2 is a schematic diagram of a rectifier for dynamic boost with constant current mode, in accordance with various embodiments.

FIG. 2 is a schematic diagram of a circuit 200 for dynamic boost with constant current mode. The circuit 200 includes one or more sub-circuits, including a field coil, input filter, and rectifying circuit. It should be noted that the various components of the circuit 200 are schematically illustrated in FIG. 2, and that modifications to the various components and other arrangements of the circuit 200 may be possible and in accordance with the various embodiments.

In various embodiments, the field coil may be configured to receive the wireless power signal and generate an AC voltage to be input to the input filter. The input filter may be configured to filter (e.g., remove) DC components from the received signal. The rectifying circuit may include a four transistors configured to rectify an input signal (e.g., AC signal generated by the field coil, and filtered by the input filter) and produce an output signal (e.g., a DC signal generated as an output of the rectifying circuit). In various examples, the transistors may include, without limitation, field effect transistors (FET), such as metal oxide semiconductor FETs (MOSFET) or junction FET (FET).

In various embodiments, the rectifying circuit may further be configured to dynamically boost the output signal, in this example VRECT. For example, in some embodiments, the rectifying circuit may be controlled by switching of the four transitions according to specific conditions. In some examples, dynamic boosting includes switching on of both low side transistors after a falling edge (e.g., transition from high voltage to low voltage) of the input signal at a first node (AC1) and/or the input signal at a second node (AC2), for a period of time Tboost. The falling edge may generally be considered the transition from a high signal, such as a positive peak voltage of an AC signal, to a low signal, such as a negative peak voltage of the AC signal (e.g., a transition from the highest, substantially highest, or near highest voltage in the waveform (crest) to the lowest, substantially lowest, or near lowest voltage in the waveform (trough)). By engaging the two low-side transistors, a duty cycled "short" may be presented to the field coil (e.g., the input signal may be shorted (to ground) for the duration of Tboost), thus creating a boosting effect.

While under dynamic boost, a CCM may be enabled. CCM is a special rectifier mode that forces both the high-side and the low-side transistors to remain on (or off) following an ACx on (or off) transition, respectively. CCM effectively forces the transistors of the rectifying circuit to be on, such that the coil resonates with the VRECT capacitor instead of the Qi parallel capacitor. Thus, CCM reduces the voltage boosting caused by the third harmonic of the coil.

Specifically, in some examples, in some light load conditions (e.g., a load current less than or equal to 230 milliamps (mA)), the combination of Tboost time, VRECT voltage, and coil dynamics may lead the rectifier comparators to become activated more than once per FCLK period and causing multiple Tboost events (e.g., causing dynamic boost be re-enabled multiple times). The conditions under which this may occur can vary based on coil parameters, output capacitor, and process, voltage, temperature (PVT) variations. Enabling CCM in conjunction with dynamic boost may prevent multiple activations of the rectifier comparator described above. Under CCM, the field coil may be caused to continuously hold a charge. That is, the field coil may be prevented from being fully discharged while the rectifying circuit is operating in dynamic boost. In some examples, the control logic may be configured to cause a wireless power transmitter, such as wireless power transmitter 105, to charge the field coil of the wireless power transmitter 105 (e.g., transmitter-side field coil) before it becomes completely discharged (e.g., enable a current to flow through the transmitter-side field coil before a current in the wireless power receiver field coil (e.g., receiver-side field coil) reaches 0). Alternatively, the wireless power transmitter 105 may be enabled and current caused to flow through the transmitter-side field coil when the receive-side field coil reaches a threshold current that is greater than 0.

In some examples, CCM forces the rectifier output transistors to remain enabled until the CCM_TON timer expires. In some examples, the CCM_TON timer may have a duration of approximately 1 μs. CCM may also force the rectifier output FETs to remain disabled until the CCM_TOFF timer expires. In some examples, the CCM_TOFF timer may have a duration of approximately 1p s. When CCM is disabled, the on-time and off-time of the rectifier can vary and is determined by the coil network (e.g., the ratio of loops in the transmitter-side field coil to the receiver-side field coil, etc.), VRECT voltage, load capacitor, and load current. CCM may prevent VRECT boosting due to the third harmonic of the coil at light loads, thus preventing the rectifier from hitting overvoltage protection (OVP) at light loads.

Accordingly, dynamic boost and CCM perform orthogonal functions. Dynamic boost increases VRECT voltage and only operates on the low-side transistors. CCM is designed to reduce VRECT at light loads and operates on both high-side and low-side transistors. Using CCM in combination with dynamic boost is based on the observation that large ringing on the input signal AC nodes (AC1 and AC2) in DCM can cause the rectifier comparators to turn on/off the rectifier output transistors multiple times per FCLK cycle. This results in undesired behavior in dynamic boost mode and can result in VRECT dropping and poor ASK magnitude/phase response. Preventing the rectifier from entering DCM using forced CCM eliminates these issues. Moreover, dynamic boost forces both low side transistors to be engaged for time Tboost. CCM forces the rectifier to operate with a minimum on-time (CCM_TON) and minimum off-time (CCM_TOFF) for the output transistors.

To prevent comparator chatter from causing a transition between TON and TOFF, a debounce calibration circuit may be used to determine respective debounce times for CCM-_TON and CCM_TOFF. Specifically, a TON debounce time may be referred to as a RECT_TON_DB and a TOFF debounce time may be referred to as RECT_TOFF_DB. Thus, comparator outputs that do not meet or exceed the debounce time (e.g., shorter duration than the debounce time) may be ignored, and respectively, may not cause the rectifier to enter the TON phase or TOFF phase until respective debounce times have elapsed (e.g., have been met or exceeded by a comparator output). In various examples, a calibration procedure may first be utilized to determine a respective debounce time (e.g., RECT_TON_DB and RECT_TOFF_DB). In various examples, CCM_TON may be determined based, at least in part, on RECT_TON_DB and CCM_TOFF may be determined based, at least in part, on RECT_TOFF_DB.

Figure 3:
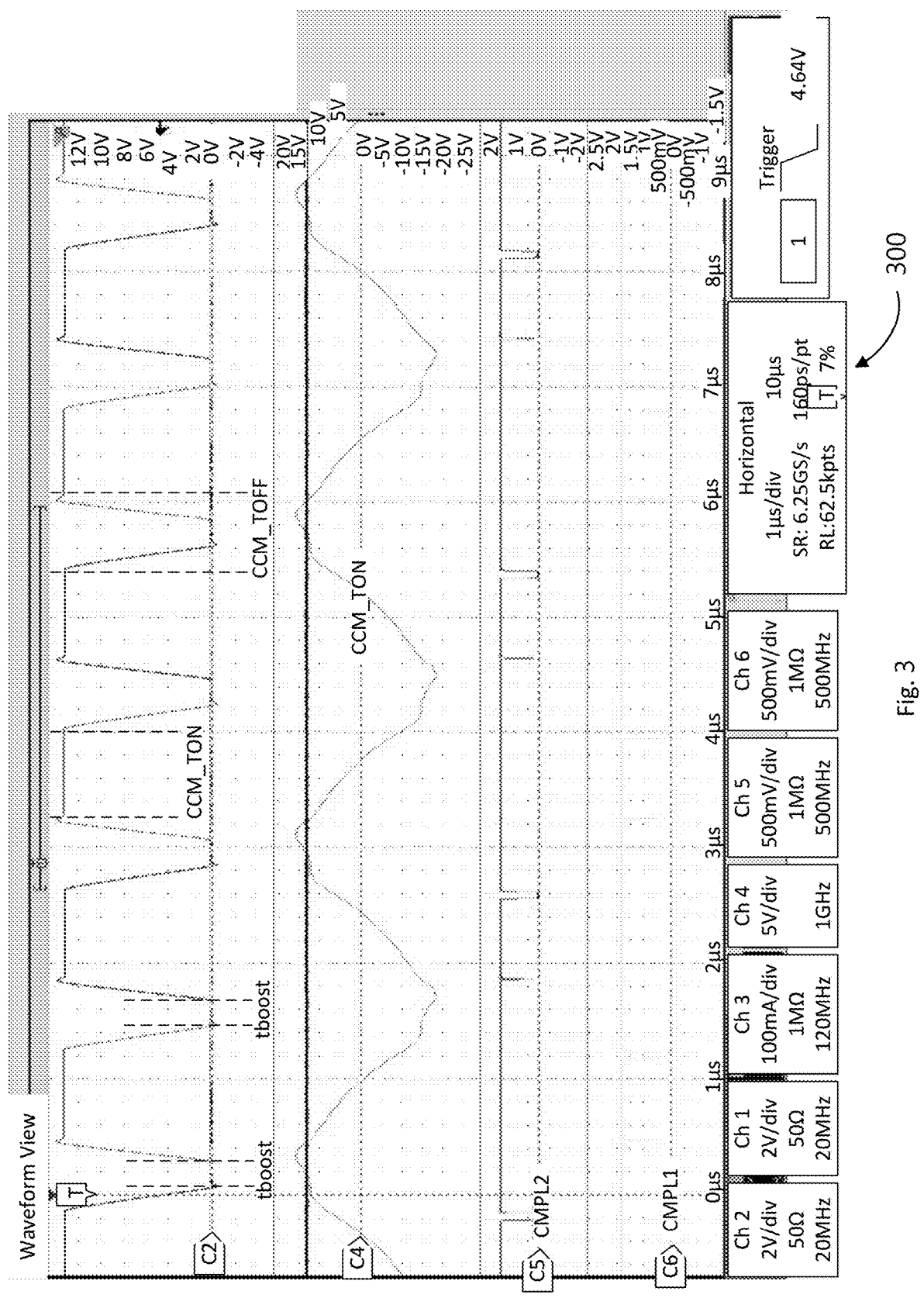
FIG. 3 is a timing diagram illustrating various signals in a rectifier implementing dynamic boost with constant current mode, in accordance with various embodiments.

FIG. 3 is a timing diagram 300 illustrating various signals in a rectifier implementing dynamic boost with constant current mode, in accordance with various embodiments. A first graph plots the input signal at the first node (AC1) and the input signal at the second node (AC2) over time. The second graph plots VRECT and the input signal current waveforms over time. The third and fourth graphs plot the output of respective low-side comparators. As can be seen, when the output of the comparator in the third graph is low, it is ignored due to it occurring before a CCM debounce time has elapsed.

Figure 4:
FIG. 4 is a flow diagram of a method of implementing dynamic boost with CCM, in accordance with various embodiments.

FIG. 4 is a flow diagram of a method 400 of implementing dynamic boost with CCM. The method 400 includes, at block 405, determining whether dynamic boost is enabled. At block 410, the method 400 continues by enabling operation in CCM, as previously described. At block 415, the method 400 includes determining a threshold debounce time. As previously described, determining a threshold debounce time may include determining a debounce time based on debounce calibration. At block 420, it is determined whether the comparator output is held for the debounce time. If the debounce time is met, at block 425, the operation of the output transistor may be switched.

Figure 5:
FIG. 5 is a schematic block diagram of a computer system for dynamic boost with CCM, in accordance with various embodiments.

FIG. 5 is a schematic block diagram of a computer system 500 for dynamic boost with CCM, in accordance with various embodiments. FIG. 5 provides a schematic illustration of one embodiment of a computer system 500, which may perform the methods provided by various other embodiments, as described herein. It should be noted that FIG. 5 only provides a generalized illustration of various components, of which one or more of each may be utilized as appropriate. FIG. 5, therefore, broadly illustrates how individual system elements may be implemented in a relatively separated or relatively more integrated manner.

The computer system 500 includes multiple hardware elements that may be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and microcontrollers); one or more input devices 515, which include, without limitation, a mouse, a keyboard, one or more sensors, and/or the like; and one or more output devices 520, which can include, without limitation, a display device, and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 500 might also include a communications subsystem 530, which may include, without limitation, a modem, one or more radios, transceivers, a network card (wireless or wired), an IR communication device, a wireless communication device and/or chipset (such as a Bluetooth™ device, an 802.11 device, a WiFi device, a WiMax device, a WWAN device, a Z-Wave device, a ZigBee device, cellular communication facilities, a wireless integrated circuit (IC) device, etc.), and/or a low-power wireless device. The communications subsystem 530 may permit data to be exchanged with a network (such as the network described below, to name one example), with other computer or hardware systems, between data centers or different cloud platforms, and/or with any other devices described herein. In many embodiments, the computer system 500 further comprises a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, application specific integrated circuits (ASICs), system on a chip (SoC), or other custom IC) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer system 500, various computer readable media might be involved in providing instructions/ code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally receives the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. An apparatus comprising:
a first circuit configured to receive a first signal and generate a first input signal and a second input signal from the first signal, wherein the first signal is a wireless power signal, and the first input signal and second input signal are alternating current signals;
a second circuit configured to rectify the input signal, wherein rectifying the input signal generates an output signal, wherein the output signal is a direct current signal, wherein the second circuit further comprises:
a first low-side transistor;
a second low-side transistor;
a first high-side transistor;
a second high-side transistor;
wherein the second circuit is configured to dynamically boost the output signal, wherein dynamically boosting the output signal includes enabling the first and second low-side transistors, on a falling edge of the first input signal or a falling edge of the second input signal, for a boost duration; and
a first logic coupled to the second circuit, the first logic configured to cause the second circuit to enter a constant current mode, wherein in a constant current mode the second circuit is further configured to force the first and second high-side transistors and first and second low-side transistors to remain enabled for a duration of a first debounce time following a rising edge of the first or second input signals.

2. The apparatus of claim 1, wherein the rising edge is a transition from a negative peak voltage to a positive peak voltage in the respective first or second input signal.

3. The apparatus of claim 1, wherein the first logic is configured to determine the first debounce time based, at least in part, on a debounce calibration.

4. The apparatus of claim 1, wherein the first circuit includes a first coil, wherein in the constant current mode, the first coil is prevented from discharging below a first threshold current.

5. The apparatus of claim 1, wherein in the constant current mode the second circuit is further configured to force the first and second high-side transistors and first and second low-side transistors to remain disabled for a second debounce time following a falling edge of the first or second input signals.

6. The apparatus of claim 5, wherein the falling edge is a transition from a positive peak voltage to a negative peak voltage in the respective first or second input signal.

7. The apparatus of claim 1, wherein the second circuit further comprises a first comparator, wherein at least one of the first low-side transistor or second low-side transistor is disabled based on an output of the first comparator.

8. The apparatus of claim 7, wherein the output of the first comparator is ignored during the first debounce time.

9. A circuit comprising:
a first coil configured to receive a wireless signal and generate an input signal, wherein the input signal is an alternating current signal;
a rectifier configured to generate an output signal from the alternating current signal, wherein the output signal is a direct current signal, wherein the rectifier comprises:
a first low-side transistor;
a second low-side transistor;
a first high-side transistor;
a second high-side transistor;
wherein the rectifier is configured to dynamically boost the output signal, wherein dynamically boosting the output signal includes enabling the first and second low-side transistors, on a falling edge of the first input signal or a falling edge of the second input signal, for a first duration, and wherein the first and second high-side transistors and first and second low-side transistors to are forced to remain enabled for a first debounce time following a rising edge of the first or second input signals.

10. The circuit of claim 9, wherein the rising edge is a transition from a negative peak voltage to a positive peak voltage in the respective first or second input signal.

11. The circuit of claim 9, wherein in the constant current mode, the first coil is prevented from discharging below a first threshold current.

12. The circuit of claim 9, wherein the first and second high-side transistors and first and second low-side transistors are forced to remain disabled for a second debounce time following a falling edge of the first or second input signals.

13. The circuit of claim 12, wherein the falling edge is a transition from a positive peak voltage to a negative peak voltage in the respective first or second input signal.

14. The circuit of claim 9, wherein the circuit further comprises a first comparator, wherein at least one of the first low-side transistor or second low-side transistor is disabled based, at least in part, on an output of the first comparator.

15. The circuit of claim 14, wherein the output of the first comparator is ignored such that the at least one of the first low-side transistor or second low-side transistor remains enabled during the first debounce time.

16. An apparatus comprising:
a rectifier configured to receive an input signal, and generate an output signal from the input signal, wherein the input signal is an alternating current signal, and wherein the output signal is a direct current signal, wherein the rectifier comprises:
a first low-side transistor;
a second low-side transistor;
a first high-side transistor;
a second high-side transistor;
wherein the rectifier is configured to dynamically boost the output signal, wherein dynamically boosting the output signal includes enabling the first and second low-side transistors, on a falling edge of the first input signal or a falling edge of the second input signal, for a first duration, and wherein the first and second high-side transistors and first and second low-side transistors to are forced to remain enabled for a first debounce time following a rising edge of the first or second input signals.

17. The rectifier of claim 16, wherein the first and second high-side transistors and first and second low-side transistors are forced to remain disabled for a second debounce time following a falling edge of the first or second input signals.

18. The rectifier of claim 16, wherein in the constant current mode, the first coil is prevented from discharging below a first threshold current.

19. The rectifier of claim 16, wherein the circuit further comprises a first comparator, wherein at least one of the first low-side transistor or second low-side transistor is disabled based, at least in part, on an output of the first comparator after the first debounce time has elapsed from the respective rising edge of the first or second input signal.

* * * * *